Feb. 6, 1923.
J. F. WAGNER.
AGRICULTURAL IMPLEMENT WHEEL.
FILED SEPT. 9, 1920.
1,444,224.
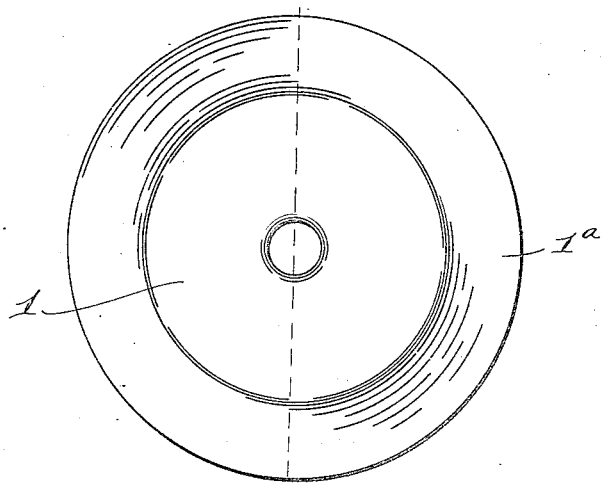
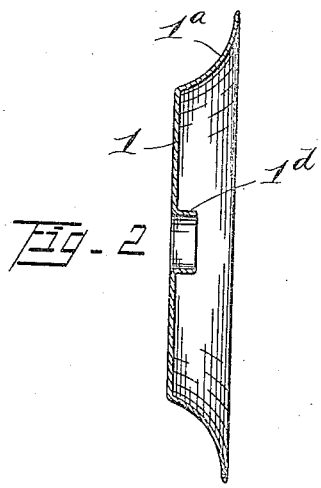
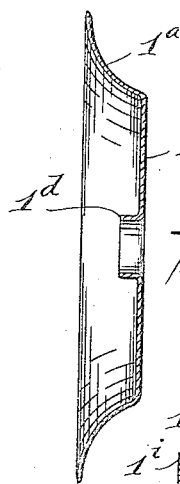
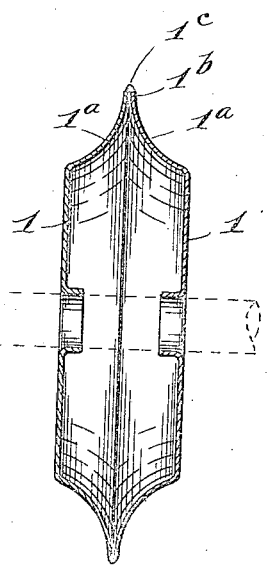
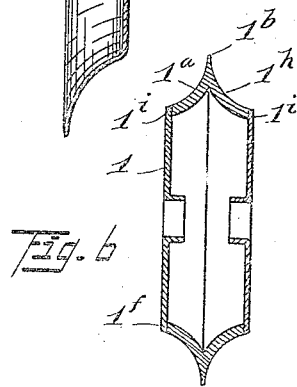
Inventor
Joseph F. Wagner
By
Chas E. Billman
Attorney Patented Feb. 6, 1923.

1,444,224

UNITED STATES PATENT OFFICE.

JOSEPH F. WAGNER, OF BEREA, OHIO, ASSIGNOR TO THE DUNHAM COMPANY, OF BEREA, OHIO, A CORPORATION OF OHIO.

AGRICULTURAL-IMPLEMENT WHEEL.

Application filed September 9, 1920. Serial No. 409,137.

*To all whom it may concern:*

Be it known that I, JOSEPH F. WAGNER, a citizen of the United States, residing at Berea, in the county of Cuyahoga and State of Ohio, have invented certain new and useful Improvements in Agricultural-Implement Wheels, of which the following is a specification.

My invention relates to improvements in agricultural implement wheels, and more particularly to that class or type of metallic wheels which are adapted to be formed of sheet metal thru the medium of suitable metal forming and welding machines, and as contra-distinguished from the ordinary agricultural cast-iron wheels used in connection with agricultural implements of this class.

More specifically speaking, the invention relates to improvements in implement wheels commonly known as "pulverizer wheels or discs", arranged in gangs and loosely mounted on an axle for pulverizing and mulching the soil, each of said wheels or discs embodying a suitable wheel body having a rim portion comprising exterior concave faces or treads converging outwardly and meeting in a soil cutting or dividing edge.

The primary object of the invention is to provide a generally improved metallic implement wheel of this class which will be exceedingly simple in construction, cheap of manufacture, and efficient in use.

A further and very important object is the provision of an improved wheel not only designed and adapted for production in modern metal bending or forming machines, but one also in which the parts are so arranged and disposed relatively to each other that the same may be readily assembled and welded thru modern welding processes.

A still further object is the provision of a metallic wheel made up of spaced discs forming the wheel sides and having concavo-convex shaped rims adapted to abut against each other and to be welded forming a hollow wheel suitably connected and welded at its tread portions, as well as one possessing great strength and not liable to become broken like the ordinary cast wheel.

With the above mentioned and other ends in view, the invention consists in the novel construction, arrangement, and combination of parts, illustrated in some of its embodiments in the accompanying drawings, and particularly pointed out in the appended claims.

Referring to the drawings, forming a part of this specification, Figure 1 is a side elevation of a metal implement wheel constructed in accordance with this invention.

Fig. 2, a central sectional view of one of the wheel guide forming discs properly formed up and flanged preparatory to being assembled and welded to form the complete wheel.

Fig. 3, a similar view of the opposite or companion wheel forming disc.

Fig. 4, a sectional view of the complete wheel.

Fig. 5, a view of a modified form of wheel, and illustrating in particular a modified form of disc connecting rim.

Fig. 6, a similar sectional view of a further modified form of wheel.

Similar numerals of reference designate like parts thruout all the figures of the drawings.

The improved wheel comprises suitably spaced discs, 1, blanked and formed out of suitable sheet metal or material and connected by means of a substantially V-shaped disc connecting rim or tread portion. The disc connecting rim or tread is preferably made up of concave exterior tread faces, $1^a$, converging outwardly and meeting in a soil penetrating or dividing edge, $1^b$, at the median or longitudinal plane of the wheel as a whole.

As a convenient means of forming the hollow wheel, the discs, 1, are provided with offset rim portions adapted to abut against each other when assembled as shown in Fig. 4 of the drawings, and when so assembled forming a convenient connecting point adapted to receive a line of welding, $1^c$, preferably in the form of an additional deposit of material as indicated in Fig. 4, of the drawings.

As a means of providing suitable bearings in the sides of the wheel body, the discs, 1, are preferably provided with inwardly extending centrally located bearing flanges, $1^d$, which may be struck out and formed up in the well known manner, said bearing flanges being admirably adapted to be loosely mounted on a bearing shaft, 2, as indicated in dotted lines in Fig. 4 of the drawings, and said draft, 2, forming the axle of the implement to support a gang of such wheels in the well known and understood manner.

If desired, the rim portions of the discs may be spaced slightly apart and a supplemental disc connecting rim, 1ᵉ, be provided, said rim forming a continuation of the tread faces, 1ᵃ, and providing a suitable medium for connecting the edges of the tread faces or rims of the discs. For such purpose, the supplemental rim, 1ᵉ, is preferably provided with shoulders, 1ᶠ, corresponding in width or depth to the thickness of the adjacent edges of the discs, and provided with a spacing member, 1ᵍ, the joint formed by the shoulders 1ᶠ and the adjacent edges of the tread forming rims of the discs being admirably adapted to receive a line of welding.

In the form shown in Fig. 6, the discs, 1, are spaced apart and connected to each other by means of a supplemental rim, 1ʰ, of substantially V-shape in cross section and provided at its sides with inset shoulders, 1ⁱ, to receive and contain the adjacent edges of the discs and form a suitable joint for welding.

Having thus described some of the embodiments of my invention, without having attempted to set forth all the forms in which it may be made, or all the modes of its use, what I claim and desire to secure by Letters Patent, is,—

1. An agricultural wheel, comprising spaced parallel extending wheel body discs, and a tapered rim welded to said discs terminating in a median edge.

2. An agricultural wheel, comprising laterally spaced wheel body discs of sheet metal, and an outwardly tapered rim connected to said discs and terminating in a median edge.

3. A metal wheel, comprising spaced disc shaped sheet metal wheel sides having concavo-convex shaped marginal portions conjointly forming a substantially V-shaped rim.

4. A metal wheel, comprising spaced disc shaped wheel sides having concavo-convex shaped welded treads terminating in a central soil penetrating edge.

5. In a hollow agricultural implement wheel, a sheet metal disc having a relatively flat side adapted to form the side of the wheel body, said side having a central bearing opening formed by an upwardly bent struck out bearing flange.

6. A hollow agricultural wheel, comprising spaced sheet metal discs forming the sides of the wheel body and terminating in outwardly converging welded rim portions forming a tapered soil cutting edge at the median longitudinal plane of said wheel.

7. A metal wheel, comprising spaced disc shaped sheet metal wheel sides having concavo-convex shaped rims welded thereto and conjointly forming a hollow wheel having a V-shaped rim.

8. A hollow agricultural wheel, comprising laterally spaced parallel extending sheet metal discs forming the sides of the wheel body and provided with central bearing openings, said discs terminating in an outwardly converging welded rim forming a relatively sharp soil cutting edge at the longitudinal center of said wheel.

9. An agricultural implement wheel comprising spaced discs provided with central bearing openings, and a substantially V-shaped disc connecting rim having concave tread faces converging outwardly and terminating in a soil penetrating edge, said rim being connected at either side to said discs by welding.

10. An agricultural implement wheel, comprising spaced metallic discs provided with central bearing openings, and a disc connecting rim having annular recesses receiving the edges, and concave tread faces converging outwardly and terminating in a soil penetrating edge, said annular recesses of said rim being connected to said discs by welding.

11. An implement wheel, comprising sheet metal discs forming the sides of the wheel body and provided with inwardly flanged central bearing openings, and a disc connecting rim provided with shouldered annular recesses receiving the edges of said discs and welded thereto.

12. A hollow agricultural implement wheel, comprising spaced discs forming the sides of the wheel body and having struck out inwardly extending bearing flanges at their center, and a disc connecting rim welded to said discs and having concave exterior tread faces outwardly converging and meeting in a soil penetrating edge at the longitudinal center of said wheel.

13. A hollow agricultural wheel, comprising spaced sheet-metal discs forming the sides of the wheel body and provided with inwardly extending centrally located bearing flanges, and a substantially V-shaped disc connecting rim welded to said discs and having concave exterior tread faces converging outwardly and meeting in a soil penetrating edge in the longitudinal median plane of said wheel.

14. A hollow agricultural wheel, comprising sheet-metal discs forming the wheel body and provided with inwardly struck out centrally located bearing flanges, and a V-shaped disc connecting welded rim having concave exterior tread faces converging outwardly and meeting in a soil penetrating edge at the longitudinal median plane of said wheel.

15. A hollow agricultural implement wheel, comprising spaced discs forming the sides of the wheel body and provided with central bearing openings, and a supplemental disc connecting rim provided with shouldered recesses receiving the edges of said discs and welded thereto, said supplemental disc connecting rim having outwardly converging sides terminating in a soil penetrating edge at the median longitudinal plane of said wheel.

In testimony whereof I have affixed my signature.

JOSEPH F. WAGNER.